United States Patent [19]

Murakami et al.

[11] Patent Number: 4,467,420
[45] Date of Patent: Aug. 21, 1984

[54] ONE-CHIP MICROCOMPUTER

[75] Inventors: Jyoji Murakami, Kawasaki; Tsuyoshi Watanabe, Yokohama, both of Japan

[73] Assignee: Fujitsu Limited, Kawasaki, Japan

[21] Appl. No.: 359,818

[22] Filed: Mar. 19, 1982

[30] Foreign Application Priority Data

Mar. 20, 1981 [JP] Japan .................. 56-40801
Mar. 25, 1981 [JP] Japan .................. 56-43503

[51] Int. Cl.$^3$ ............................................ G06F 13/06
[52] U.S. Cl. ............................................ 364/200
[58] Field of Search .................. 364/200 MS File

[56] References Cited

U.S. PATENT DOCUMENTS 4,181,938 1/1980 Suzuki et al. .................. 364/200
4,240,138 12/1980 Chauvel .................. 364/200
4,348,720 9/1982 Blahut et al. .................. 364/200

FOREIGN PATENT DOCUMENTS 2045833 4/1971 Fed. Rep. of Germany .

OTHER PUBLICATIONS

Funatsu, S. et al., "Digital Fault Simulation in Bidirectional Bus Circuit Environments", *IEEE Digest of Papers*, Oct. 1980, pp. 155–157.
Burton, D. et al., "Know a Microcomputer's Bus Structure", *Electronic Design*, vol. 26, No. 13, Jun. 1978, pp. 78–84.
Hann et al., "Mikroprozessoren, Mikroprozessrechner, und Mikroprozessrechner Systeme", *Elektrie*, vol. 32, No. 8, 1978, pp. 429–437.
Chow et al., "MAC-4: A Single-Chip Microcomputer", *The Bell System Technical Journal*, vol. 58, No. 4, Apr. 1979, pp. 959–962.

*Primary Examiner*—Raulfe B. Zache
*Attorney, Agent, or Firm*—Staas & Halsey

[57] ABSTRACT

A one-chip microcomputer including a central processing unit, a direct memory access controller and a random-access memory. In a DMA operation mode, data stored in the random-access memory is transmitted through common terminals to the exterior by means of a time-division control circuit or registers for parallel-serial conversion. The common terminals are also used for a CPU operation mode.

12 Claims, 20 Drawing Figures

ONE-CHIP MICROCOMPUTER

BACKGROUND OF THE INVENTION

The present invention relates to a one-chip microcomputer.

In the early seventies, a 4-bit microprocessor, such as Intel 4004, which was also called a microcomputer, comprised a central processing unit (abbreviated CPU) on a single chip. In recent years, however, LSI (Large Scale Integration) technology has been developed with the result that highly-integrated one-chip microcomputers have been developed. A one-chip microcomputer generally comprises a CPU, a random-access memory (abbreviated RAM), a read-only memory (abbreviated ROM), input/output (abbreviated I/O) ports, a clock generator and the like on a single chip. In other words, such a one-chip microcomputer has full computer functions on a single chip and, accordingly, cost-performance thereof can be greatly improved.

In a one-chip microcomputer, since the CPU and the RAM are connected by interconnections within the chip, data transfer between the CPU and RAM cannot generally be monitored from the exterior. As a result, it is difficult to test the chip and to detect a malfunction therein. Therefore, it is necessary to transfer data from the RAM to the exterior or vice versa, in order to monitor the CPU operation state.

Several approaches may be taken to meet the above-mentioned requirement for one-chip microcomputers. One approach is to cause the CPU to perform data transfer between the RAM and the exterior. In this case, however, the load on the CPU becomes large and, accordingly, the throughput of the microcomputer is reduced. In addition, instruction sequences (programs) are fixed in the ROM and, therefore, the operation state of the CPU is unclear. As a result, it is difficult to access a desired area of the RAM by the CPU. Another approach is to use direct memory access (abbreviated DMA). That is, under the control of a direct memory access controller (abbreviated DMAC) which is set by the CPU, the direct transfer of data is provided between the RAM and the I/O ports. In this case, however, since specialized I/O ports for the DMA operation mode are necessary, the number of terminals (pins) connected to the I/O ports is increased. For example, in the case of an 8-bit parallel transfer system, eight terminals are necessary, which is disadvantageous in practice. In addition, such additional terminals are generally necessary only during the manufacture of the microcomputer.

SUMMARY OF THE INVENTION

It is an object of the present invention to provide a one-chip microcomputer which is able to provide direct data transfer between a RAM and I/O ports (the exterior) and has a small number of I/O ports.

According to the present invention, there is provided a one-chip microcomputer comprising: a central processing unit (CPU) having arithmetic, logic and control units; a random-access memory (RAM) for storing intermediate data and instructions processed by the central processing unit; an output buffer register for storing first data processed by the central processing unit; a direct memory access controller (DMAC), controlled by the central processing unit, for reading second data from a predetermined area of the random-access memory; port means for receiving the first data from the output buffer register and the second data of the random-access memory read by the direct memory access controller; terminals connected to the port means and used commonly during a CPU operation mode and a DMA operation mode; and time-division means, controlled by the direct memory access controller, for transmitting the first and second data through the port means to the terminals.

According to the present invention, there is also provided a one-chip microcomputer comprising: a central processing unit (CPU) having arithmetic, logic and control units; a random-access memory (RAM) for storing intermediate data and instructions processed by the central processing unit; an output buffer register for storing first data processed by the central processing unit; a direct memory access controller (DMAC) controlled by the central processing unit; gate means controlled by the central processing unit; address port means for transmitting an externally applied address signal to the random-access memory through the gate means so as to read second data from the random-access memory; a port means for receiving the first data from the output buffer register and the second data of the random-access memory read by the address port means; terminals connected to the port means and used commonly during a CPU operation mode and a DMA operation mode; and time-division means, controlled by the direct memory access controller, for transmitting the first and second data through the port means to the terminals.

According to the present invention, there is also provided a one-chip microcomputer comprising: a central processing unit (CPU) having arithmetic, logic and control units; a random-access memory (RAM) for storing intermediate data and instructions processed by the central processing unit; a register for storing the same data as that of a predetermined area of the random-access memory, the write operation upon the register and the predetermined area of the random-access memory being simultaneously performed by the central processing unit; a direct memory access controller (DMAC) controlled by the central processing unit; parallel-serial converter means, controlled by the central processing unit, for converting parallel data into serial data, the parallel data being sent from the register by the direct memory access controller; and a terminal connected to the parallel-serial converter means and used commonly during a CPU operation mode and a DMA operation mode.

According to the present invention, there is still further provided a one-chip microcomputer comprising: a central processing unit (CPU) having arithmetic, logic and control units; a random-access memory (RAM) for storing intermediate data and instructions processed by the central processing unit; a direct memory access controller (DMAC) controlled by the central processing unit; an address counter, controlled by the direct memory access controller, for generating an address signal so as to read data from the random-access memory; parallel-serial converter means, controlled by the central processing unit, for converting parallel data into serial data, the data of the random-access memory accessed by the address counter being set in the parallel-serial converter means; and a terminal connected to the parallel-serial converter means and used commonly during a CPU operation mode and a DMA operation mode.

The present invention will now be more clearly understood from the description as set forth below with reference to the accompanying drawings.

DESCRIPTION OF THE PREFERRED EMBODIMENTS

Figure 1:
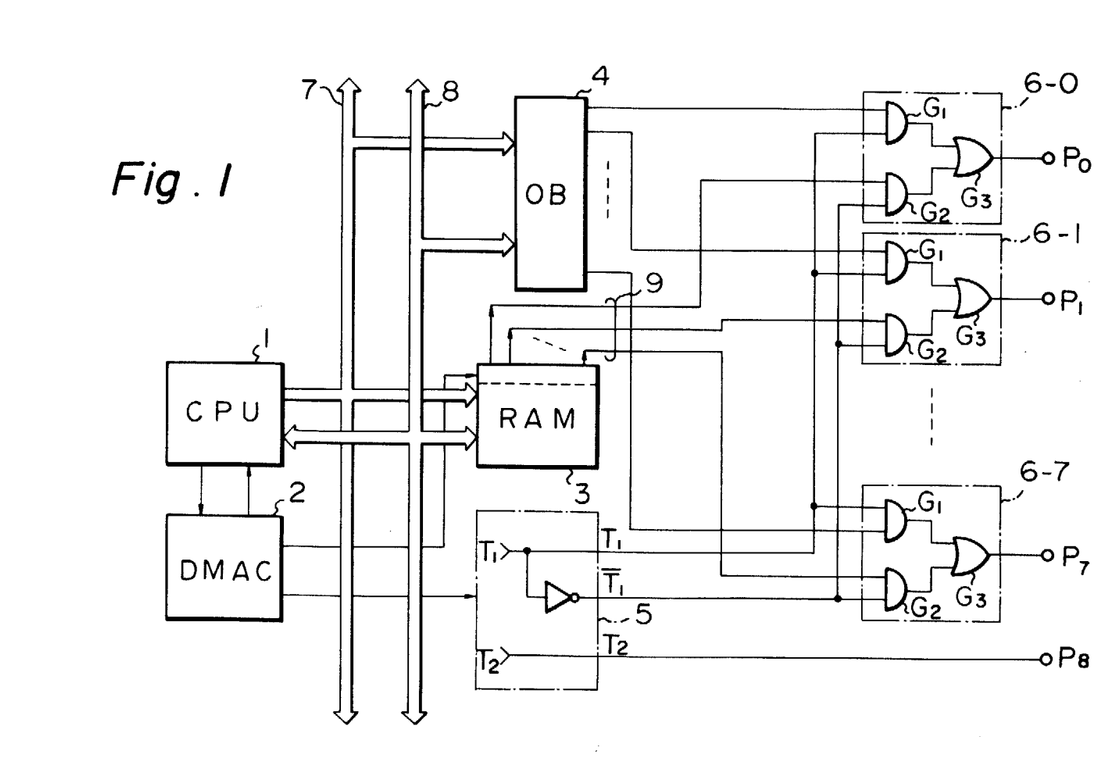
FIG. 1 is a block diagram of a first embodiment of a one-chip microcomputer according to the present invention.

In FIG. 1, is a first embodiment of the one-chip microcomputer according to the present invention, 1 is a central processing unit (CPU) having arithmetic, logic and control units; 2 is a direct memory access controller (DMAC) which is set by the CPU 1; 3 is a random-access memory (RAM) for storing intermediate data and instructions processed by the CPU 1; 4 is a output buffer register for storing output data processed by the CPU 1; 5 is a time-division control circuit controlled by the DMAC 2; 6-0, 6-1, ..., 6-7 are I/O ports; 7 is a data bus; and 8 is an address bus. The RAM 3 has a data bus 9 for a direct memory access (DMA) operation mode. All the elements of FIG. 1 are formed on a single semiconductor chip.

During a CPU operation mode, output data (which is referred to as CPU output data) is stored in the output buffer register 4 and, after that, the CPU output data is transferred through the ports 6-0, 6-1, ..., 6-7 and terminals $P_0$, $P_1$, ..., $P_7$ to the exterior. However, during the DMA operation, output data (which is referred to as DMA output data) is read out of a predetermined area of the RAM 3 to the DMA data bus 9 by the DMAC 2. In this case, the predetermined area is comprised of one word or eight bits. The DMA output data is also transferred through the ports 6-0, 6-1, ..., 6-7 and the terminals $P_0$, $P_1$, ..., $P_7$ to the exterior. Time-division control for this type of output data is performed by the time-division control circuit 5 which is also controlled by the DMAC 2.

Figure 2A:
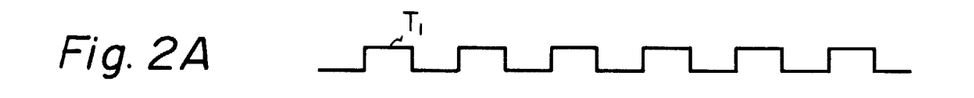
FIGS. 2A and 2B are timing diagrams of signals appearing in the circuit of FIG. 1.
Figure 2B:
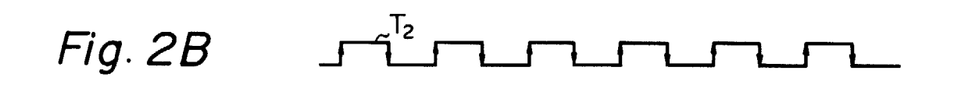

In more detail, the time-division control circuit 5, which is controlled by the DMAC 2, generates a clock signal $T_1$ as illustrated in FIG. 2A, its inverted signal $\overline{T}_1$ and a clock signal $T_2$ is illustrated in FIG. 2B. In this case, the difference in phase between the clock signals $T_1$ and $T_2$ is about 90 degrees. Such clock signals $T_1$ and $T_2$ can be easily formed by using a reference signal of a reference clock generator and frequency dividers (not shown). On the other hand, each of the ports 6-0, 6-1, ..., 6-7 comprise two AND gates $G_1$ and $G_2$, and an OR gate $G_3$. Each gate $G_1$ transmits the CPU output data from the output buffer register 4 to the exterior when the potential of the clock signal $T_1$ is high, while each gate $G_2$ transmits the DMA output data from the RAM 3 to the exterior when the potential of the clock signal $\overline{T}_1$ is high. Thus, the CPU output data and the DMA output data are alternately transmitted through the ports 6-0, 6-1, ..., 6-7 and the terminals $P_0$, $P_1$, ..., $P_7$ to the exterior.

It should be noted that the read operation timing of the DMAC 2 for the RAM 3 is in synchronization with the high potential of the clock signal $\overline{T}_1$.

Next, the separation of the CPU data and the DMA data will be explained. In an external circuit (not shown), when the data at the terminals $P_0$ through $P_7$ is read based on the fall of the potential of the clock signal $T_2$ output at the terminal $P_8$, the CPU output data is obtained. However, when the data at the terminals $P_0$ through $P_7$ is read based on the rise of the potential of the clock signal $T_2$, the DMA output data is obtained.

Figure 3:
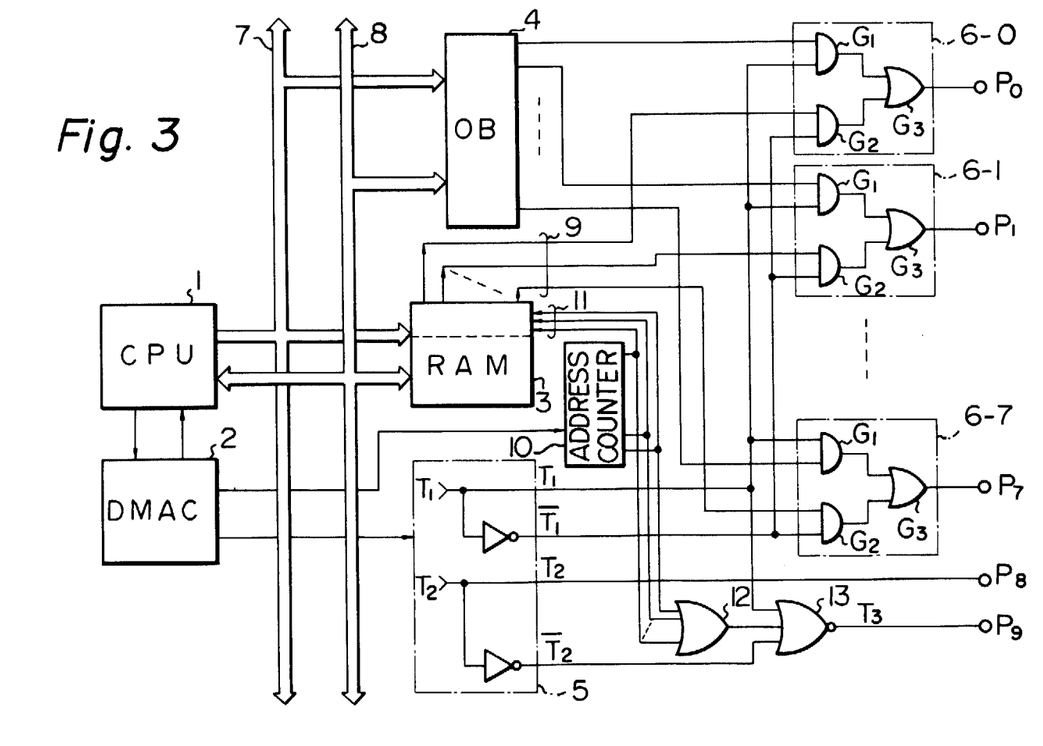
FIG. 3 is a block diagram of a second embodiment of the one-chip microcomputer according to the present invention.

FIG. 3 is a block diagram illustrating a second embodiment of the one-chip microcomputer according to the present invention. In FIG. 3, an address counter 10, a DMA address bus 11, an OR gate 12 and a NOR gate 13 are added to FIG. 1. In addition, the time-division control circuit 5 generates an inverted signal $\overline{T}_2$ of the clock signal $T_2$ for a terminal $P_9$. The DMAC 2 increases the count of the address counter 10 which generates an address signal for the DMA address bus 11. Therefore, a plurality of words which serve as the DMA data are read out of the RAM 3 to the DMA data bus 9. For example, if the address counter 10 comprises 4 bits, eight words allocated by addresses "0", "1", "2", ..., "7" can be read out from the RAM 3.

The CPU data and the DMA data are alternately transmitted through the ports 6-0, 6-1, ..., 6-7 to the terminals $P_0$, $P_1$, ..., $P_7$ in the same way as in FIG. 1. In this case, however, it is necessary to know the address of a DMA output data (word) transmitted at the terminals $P_0$, $P_1$, ..., $P_7$. For this purpose, a terminal $P_9$ is provided.

Figure 4A:
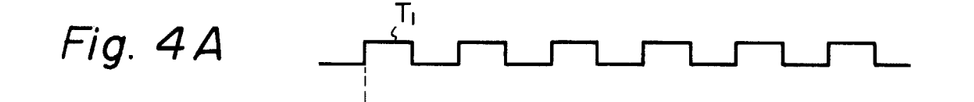
FIGS. 4A through 4C are timing diagrams of signals appearing in the circuit of FIG. 3.
Figure 4B:
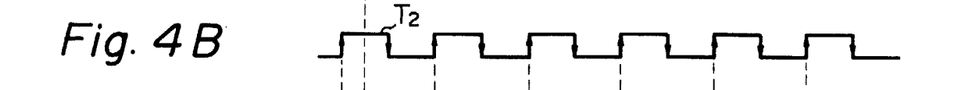
Figure 4C:
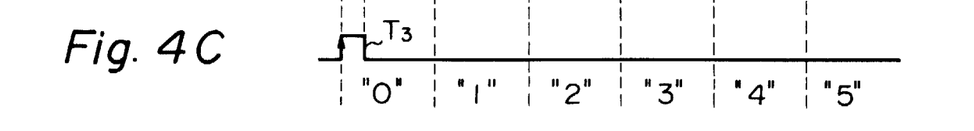

The output potential of the OR gate 12 is low only when the value of the address counter 10 is 00 ... 0 (="0"). In addition, as illustrated in FIGS. 4A, 4B and 4C, the output potential $T_3$ of the NOR gate 13 is high only when the potential of each of the signals $T_1$ and $\overline{T}_2$ and the value of the address counter 10 is "0". Therefore, the value of the address counter 10 can be read by providing an appropriate external counter (now shown). That is, the external counter is reset by the rise of the potential $T_3$ at the terminal $P_9$ and increases by one count based on the rise of the potential $T_2$.

Figure 5:
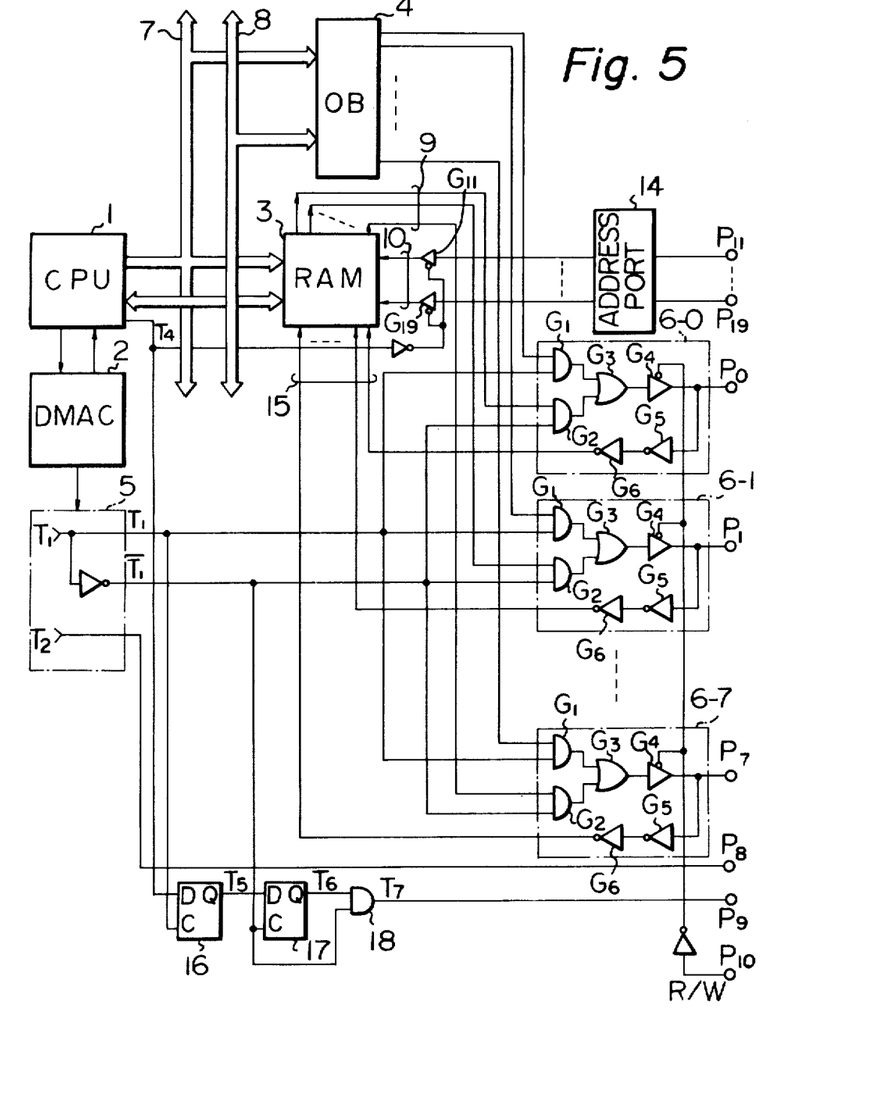
FIG. 5 is a block diagram of a third embodiment of the one-chip microcomputer according to the present invention.

FIG. 5 is a block diagram illustrating a third embodiment of the one-chip microcomputer according to the present invention. In FIG. 5, terminals $P_{11}$ through $P_{19}$, an address port 14, the gates $G_{11}$ through $G_{19}$ are provided to access the RAM 3 directly from the exterior during the DMA operation mode. Each of the ports 6-0, 6-1, ..., 6-7, which comprise six gates $G_1$ through $G_6$, is bidirectional. The bidirectional I/O ports 6-0, 6-1, ..., 6-7 are connected to a DMA write data bus 15. D-type flip-flops 16 and 17, and an AND gate 18 are provided for a permission signal $T_7$, which permits a DMA read or write operation.

Figure 6A:
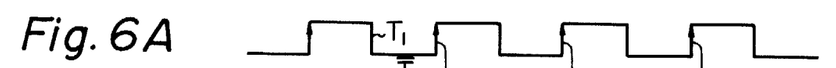
FIGS. 6A through 6J are timing diagrams of the signals appearing in the circuit of FIG. 5.
Figure 6B:
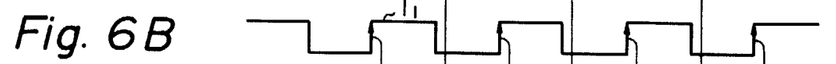
Figure 6C:
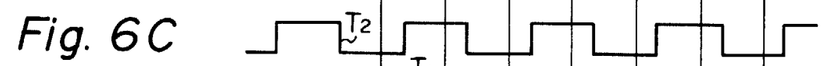
Figure 6D:
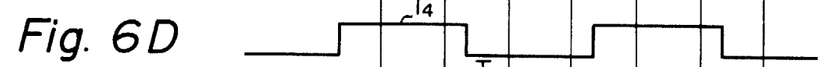
Figure 6E:
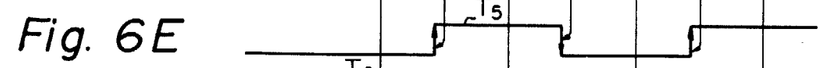
Figure 6F:
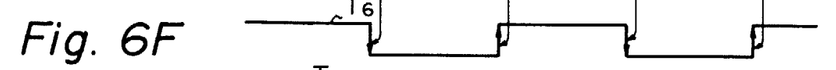
Figure 6G:
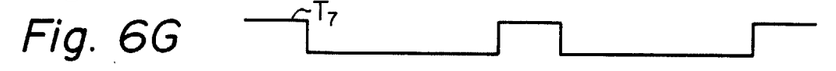

In more detail, based on the rise of the potential of the signal $T_1$, as illustrated in FIG. 6A, the flip-flop 16 inputs the potential of signal $T_4$, as illustrated in FIG. 6D, which is generated by the CPU 1. As a result, the flip-flop 16 generates a signal $T_5$, as illustrated in FIG. 6E. Further, by the rise of the potential of the signal $\overline{T}_1$ as illustrated in FIG. 6B, the flip-flop 17 stores the signal $T_5$, and, accordingly, the flip-flop 17 generates a signal $T_6$, as illustrated in FIG. 6F. Therefore, the permission signal $T_7$ generated from the AND gate 18, which receives the signals $T_1$ and $T_6$, is illustrated in FIG. 6G.

Figure 6H:
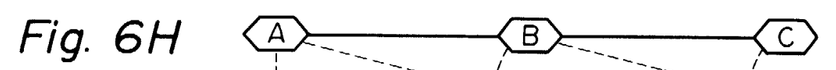
Figure 6I:
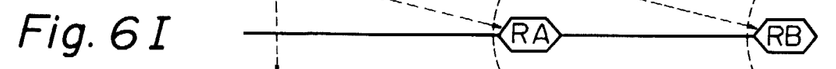

During the DMA read or write operation mode, the potential of each of the signals $T_4$ and $T_7$ is low and high, respectively. As a result, the gates $G_{11}$ through $G_{19}$ are opened so that the address port 14 accesses the RAM 3 by supplying an externally-applied address signal. In addition, during the DMA read operation mode, the potential of a read/write signal R/W applied to a terminal $P_{10}$ is caused to be high, so as to open gate $G_4$ of each port 6-0, 6-1, ..., 6-7. As a result, the ports 6-0, 6-1, ..., 6-7 transmit the DMA data from the RAM 3 to the exterior. In this case, for a time-period during which the potentials of each of the signals $T_4$ and $T_7$ are high and low, respectively, the CPU data is transmitted from the output buffer register 4 through the ports 6-0, 6-1, ..., 6-7 to the exterior. This type of data, that is, DMA data and CPU data, can be discriminated between by the signal $T_2$ obtained at the terminal $P_8$, as illustrated in FIG. 6C. In such a DMA read mode, when address signals A, B, ... are supplied to the address port 14, as illustrated in FIG. 6H, DMA read data RA, RB, ... are obtained at the terminal $P_0$ through $P_7$, as illustrated in FIG. 6I.

Figure 6J:
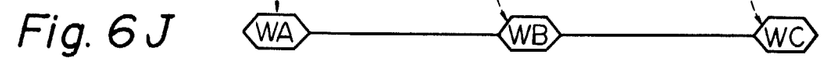

On the other hand, during the DMA write operation mode, the potential of the signal R/W is caused to be low, to close the gate $G_4$ of each port 6-0, 6-1, ..., 6-7. Therefore, write data applied to the terminals $P_0$, $P_1$, ..., $P_7$ is written into an area of the RAM 3 accessed by the address port 14. In this case, as illustrated in FIGS. 6H and 6J, write data WA, WB, WC, ... is applied simultaneously with the corresponding address A, B, C, ....

Figure 7:
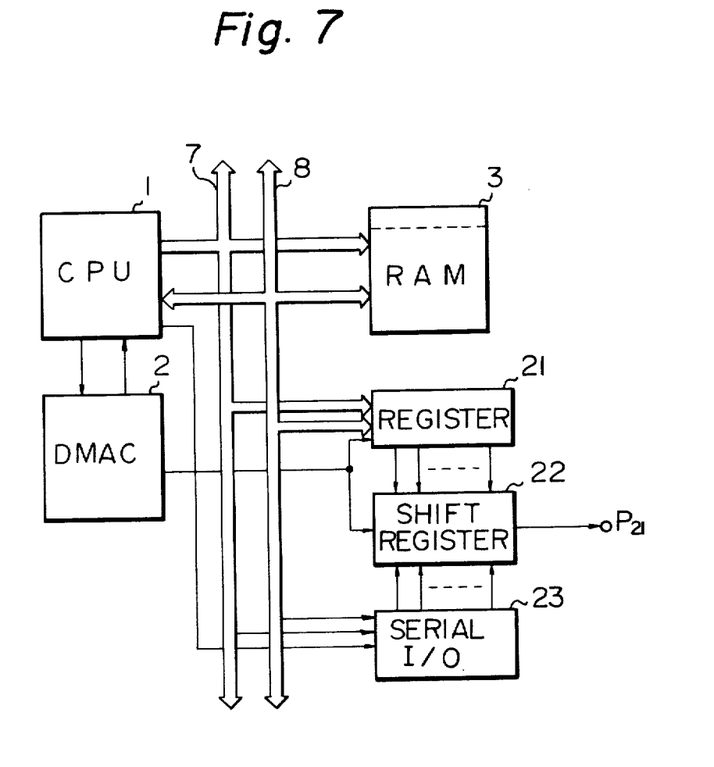
FIG. 7 is a block diagram of a fourth embodiment of the one-chip microcomputer according to the present invention.

FIG. 7 is a block diagram illustrating a fourth embodiment of the one-chip microcomputer according to the present invention. In FIG. 7, 21 is a resister for storing the same data as that of a predetermined area of the RAM 3. That is, when the CPU 1 performs a write operation upon the predetermined area of the RAM 3, the CPU 1 also performs the same write operation upon the register 21. Therefore, the data of the register 21 is always the same as that of the predetermined area of the RAM 3.

During the DMA read operation mode, the DMAC 2, which is set by the CPU 1, transmits the contents of the register 21 to a shift register 22. Next, a shift clock signal generated from a clock generator (not shown) is supplied to the shift register 22, so that the shift operation is performed upon the shift register 22. Therefore, the parallel data stored in the register 21 is converted into serial data which is transmitted through a terminal $P_{21}$ to the exterior.

It should be noted that the above-mentioned predetermined area of the RAM 3 comprises a word (8 bits) allocated to one address. In addition, the predetermined area can comprise at least one predetermined bit (i.e., a bit slice) of predetermined data words which are, for example, allocated by addresses "0", "1", ..., "7".

Figure 8:
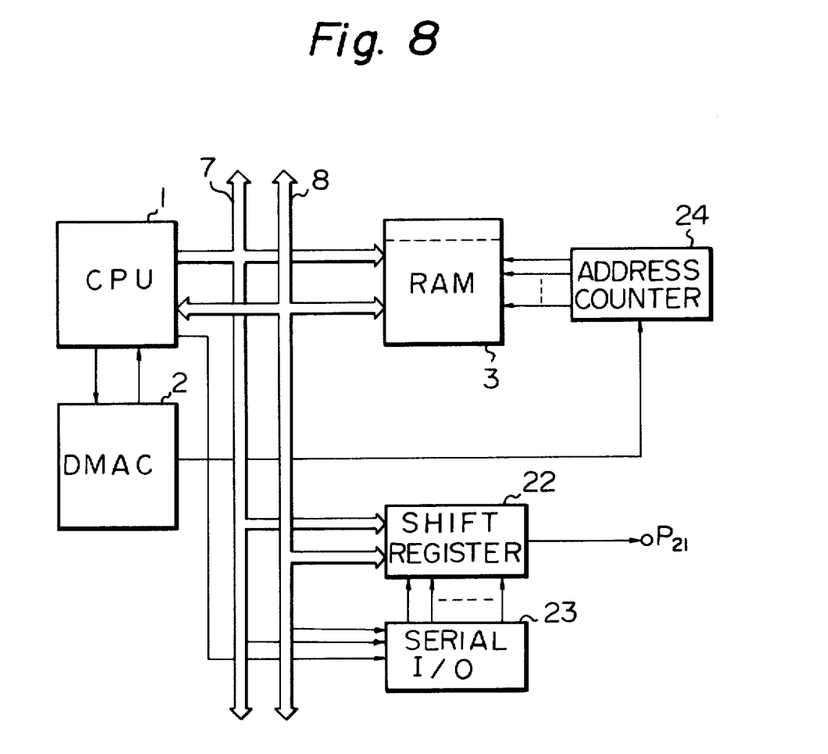
FIG. 8 is a block diagram of a fifth embodiment of the one-chip microcomputer according to the present invention.

FIG. 8 is a block diagram illustrating a fifth embodiment of the one-chip microcomputer according to the present invention. In FIG. 8, an address counter 24 is provided instead of the register 21 of FIG. 7. That is, the DMAC 2 increases the count of the address counter 24, so that one word data (8 bits) is read out of the RAM 3 into the shift register 22. Next, a shift clock signal generated from a clock signal generator (not shown) is supplied to the shift register 22, so that the shift operation is performed on the shift register 22, in the same way as in FIG. 7. For example, if the address counter 10 comprises 4 bits, eight words allocated by the addresses "0", "1", ..., "7" can be read out of the RAM 3 to the shift register 22.

In FIGS. 7 and 8, the DMAC 2 includes division means similar to those used in the previous examples to control, via the CPU 1, whether the first data is fed from the serial input/output circuit 23 to the shift register 22 or the second data is fed from the register 21 (or the RAM 3) to the shift register 22.

Note that, in FIGS. 7 and 8, the DMA operation wherein the data is set in the shift register 22 by the DMAC 2 is never superposed with the CPU operation wherein the shift operation is performed upon the shift register 22.

As explained hereinbefore, the present invention has an advantage in that direct data transfer between the RAM and the exterior can take place without increasing the number of terminals.

We claim:

1. A one-chip microcomputer having a direct memory access and central processing unit operation mode, comprising:

a central processing unit having arithmetic, logic and control units, for setting the direct memory access operation mode or central processing unit operation mode and for processing first and second data;

a random-access memory, operatively connected to said central processing unit, for storing the second data in a predetermined area and instructions processed by said central processing unit;

an output buffer register, operatively connected to said central processing unit, for storing the first data processed by said central processing unit;

a direct memory access controller, operatively connected to and controlled by said central processing unit, for reading out the second data from the predetermined area of said random-access memory;

port means, operatively connected to said output buffer and said random access memory, for receiving the first data from said output buffer register and the second data, from said random-access memory;

terminals operatively connected to said port means and used for the central processing unit operation mode and the direct memory access operation mode; and time-division means, operatively connected to said direct memory access controller and said port means and controlled by said direct memory access controller, for transmitting the first and second data through said port means to said terminals.

2. A one-chip microcomputer as set forth in claim 1, further comprising an address counter, operatively connected to said direct memory access controller and said random access memory and controlled by said direct memory access controller, for generating an address signal to read the second data from the predetermined area of said random-access memory.

3. A one-chip microcomputer having a direct memory access and central processing unit mode, comprising:

a central processing unit having arithmetic, logic and control units, for setting the direct memory access operation mode or central processing unit operation mode, and for processing first and second data;

a random-access memory, operatively connected to said central processing unit, for storing the second data in a predetermined area and instructions processed by said central processing unit;

an output buffer register, operatively connected to said central processing unit and said random access memory, for storing the first data processed by said central processing unit;

a direct memory access controller operatively connected to and controlled by said central processing unit;

gate means, operatively connected to said random access memory and said central processing unit, for passing signals therethrough and controlled by said central processing unit;

address port means, operatively connected to said gate means, for transmitting an externally applied address signal to said random-access memory through said gate means to read the second data from said random-access memory;

port means, operatively connected to said output buffer register and said random access memory, for receiving the first data from said output buffer register and the second data from said random-access memory read under the control of said address port means;

terminals operatively connected to said port means and used for the central processing unit operation mode and the direct memory access operation mode; and time-division means, operatively connected to said direct memory access controller and said port means and controlled by said direct memory access controller, for transmitting the first and second data through said port means to said terminals.

4. A microcomputer as set forth in claim 3, wherein said port means comprises bidirectional input/output ports, operatively connected to said random access memory and said output buffer register, through which an externally applied data signal is written into an area of said random-access memory accessed under the control of said address port means.

5. A one-chip microcomputer, having a central processing unit and direct memory access mode, comprising:

a central processing unit having arithmetic, logic and control units for setting the direct memory access or central processing unit operation mode, and for processing first and second data;

a random-access memory, operatively connected to said central processing unit, for storing the second data in a predetermined area and instructions processed by said central processing unit;

a register, operatively connected to said random access memory and said central processing unit, for storing the same data as that in said predetermined area of said random-access memory, a write operation upon said register and said predetermined area of said random-access memory being simultaneously performed by said central processing unit;

direct memory access controller operatively connected to said central processing unit and said register and controlled by said central processing unit;

parallel-serial converter means, operatively connected to said central processing unit, said random access memory and said direct memory access controller, and controlled by said central processing unit, for converting parallel data into serial data, said parallel data being sent from said register by said direct memory access controller; and a terminal operatively connected to said parallel-serial converter means and used for the central processing unit operation mode and the direct memory access operation mode.

6. A one-chip microcomputer as set forth in claim 5, wherein said parallel-serial converter means comprises:

a shift register, operatively connected to said register and said direct memory access controller, for receiving parallel data from said register; and a serial input/output circuit, operatively connected to said central processing unit, said shift register, and said random access memory, and controlled by said central processing unit, for performing a shift operation upon said shift register.

7. A one-chip microcomputer as set forth in claim 5, wherein the predetermined area of said random-access memory comprises at least one predetermined bit of predetermined data words.

8. A one-chip microcomputer having a central processing unit and data memory access operation mode, comprising:

a central processing unit having arithmetic, logic and control units for setting direct memory access or central processing unit operation modes, and for processing first and second data;

a random-access memory, operatively connected to said central processing unit, for storing the second data and instructions processed by said central processing unit;

a direct memory access controller operatively connected to and controlled by said central processing unit;

an address counter, operatively connected to said random access memory and said direct memory access controller and controlled by said direct memory access controller for generating an address signal for said random-access memory;

parallel-serial converter means, operatively connected to said central processing unit and said random access memory, and controlled by said central processing unit, for converting parallel data into serial data, the data of said random-access memory accessed under the control of said address counter being input into said parallel-serial converter means; and a terminal operatively connected to said parallel-serial converter means and used for the central processing unit operation mode and direct memory access operation mode.

9. A one-chip microcomputer as set forth in claim 8, wherein said parallel-serial converter means comprises:

a shift register operatively connected to said random access memory and said central processing unit, for receiving parallel data from said random-access memory; and a serial input/output circuit, operatively connected to said shift register, said central processing unit, and said random access memory and controlled by said central processing unit, for performing a shift operation on said shift register.

10. A one-chip microcomputer as set forth in claim 3, further comprising flip-flops, operatively connected to said time division means and said terminals, for providing a permission signal to permit the direct memory access operation mode.

11. A one-chip microcomputer as set forth in claim 1, wherein said port means comprises input/output ports, operatively connected to the respective said terminals, said random access memory and said output buffer, each port means comprising:
   two AND gates each operatively connected to said output buffer and said random access memory; and
   an OR gate operatively connected between said two AND gates and the respective said terminal.

12. A one-chip microcomputer as set forth in claim 1, wherein said time division means comprises inverters operatively connected to said port means and said direct memory access controller.

* * * * *